M. A. GREEN.
FREIGHT CAR STEP.
APPLICATION FILED DEC. 6, 1913.
1,104,661.
Patented July 21, 1914.
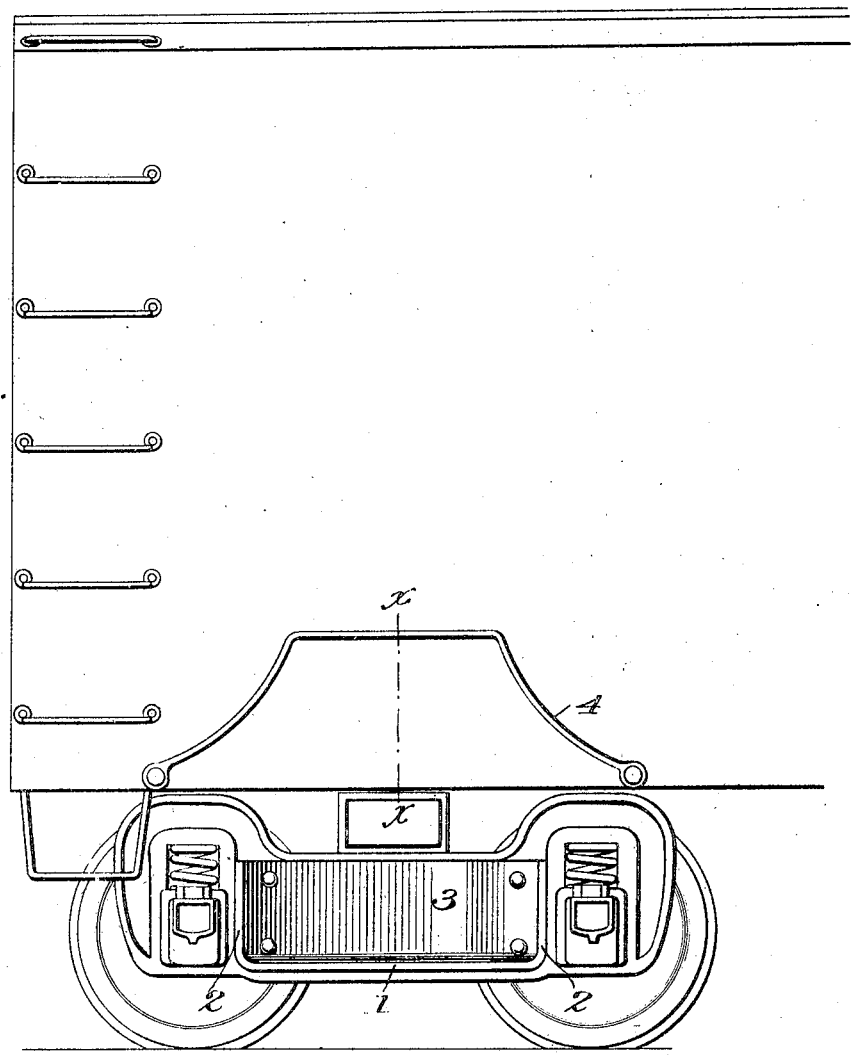
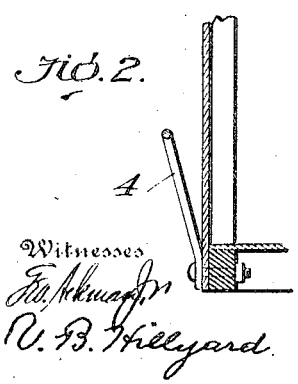
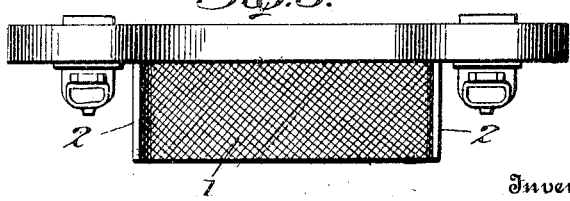
Inventor
M. A. Green
By Victor J. Evans
Attorney

UNITED STATES PATENT OFFICE.

MORGAN A. GREEN, OF MONTPELIER, IDAHO.

FREIGHT-CAR STEP.

1,104,661. Specification of Letters Patent. Patented July 21, 1914.

Application filed December 6, 1913. Serial No. 805,084.

*To all whom it may concern:*

Be it known that I, MORGAN A. GREEN, a citizen of the United States, residing at Montpelier, in the county of Bear Lake and State of Idaho, have invented new and useful Improvements in Freight-Car Steps, of which the following is a specification.

The invention has relation to means whereby a brakeman or other attendant of a freight train may mount a freight car with safety, such invention providing a step and a grab-iron in coöperative relation, the step being carried by the truck and the grab-iron being mounted upon the car in such relation to the ladder as to enable the brakeman to have easy access to the ladder.

The invention resides more particularly in the step and the manner of connecting the same to the truck so as to form in effect a part thereof.

The invention further consists of a grab-iron which is mounted upon the car above the step and at one side of the ladder, such grab-iron enabling the brakeman or other train hand to mount the step and to pass from such step to the ladder.

The invention consists of the novel features, details of construction and combination of parts, which hereinafter will be more particularly set forth, illustrated in the accompanying drawings and pointed out in the appended claims.

Referring to the drawings forming a part of the specification, Figure 1 is a side view of an end portion of a freight car provided with a safety step and grab-iron embodying the invention. Fig. 2 is a sectional view about on the line $x$—$x$ of Fig. 1. Fig. 3 is a detailed view bringing out more clearly the relation between the step and truck.

Corresponding and like parts are referred to in the following description and indicated in all the views of the drawings.

The step comprises a tread 1, end pieces 2 and back 3. The end pieces 2 preferably constitute a part of the tread and are formed by bending end portions of the tread substantially at a right angle. The back 3 may form a part of the step or may consist of a part of the truck, the purpose of such back being to prevent the foot of the train hand from projecting beyond the rear of the step and coming in contact with a wheel or other part of the truck which would be liable to cause injury. The step is of a length to come between adjacent journal boxes so as not to interfere with the free access to such journal boxes for supplying the same with lubricant or otherwise giving proper attention thereto.

The grab-iron 4 is secured to the car body and is located above the step in convenient position to be reached to enable the train hand to mount the step with safety and pass from such step to the ladder generally provided at the side of a freight car. The grab-iron may be secured to the car in any manner depending upon the particular type of the car to which the invention is adapted.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a freight car, a truck provided with a step the same being arranged in the space formed between adjacent journal boxes.

2. In a freight car, a truck having a step between adjacent journal boxes, such step having a back and end pieces.

3. In a freight car, a step provided upon the truck and arranged opposite the space formed between opposite journal boxes and a grab-iron mounted upon the car body above the step.

In testimony whereof I affix my signature in presence of two witnesses.

MORGAN A. GREEN.

Witnesses:
GEORGE A. RAGAN,
WILL. A. GOODMAN.

---

Copies of this patent may be obtained for five cents each, by addressing the "Commissioner of Patents. Washington, D. C."